United States Patent
Tseng

[19]

[11] Patent Number: 6,162,310
[45] Date of Patent: Dec. 19, 2000

[54] METHOD FOR PRODUCING POROUS SPONGE LIKE METAL OF WHICH THE SHAPES AND SIZES OF PORES ARE CONTROLLABLE

[76] Inventor: Shao-Chien Tseng, No. 130 Sec 2. Yang-Shin Rd., Yang-Mei Taoyuan 326, Taiwan

[21] Appl. No.: 09/129,985

[22] Filed: Aug. 5, 1998

[51] Int. Cl.[7] .............................. B32B 31/00; B32B 31/12
[52] U.S. Cl. ........................ 156/89.11; 156/77; 156/155; 156/89.23; 156/89.28; 156/245
[58] Field of Search ................................ 156/77, 78, 155, 156/182, 242, 245, 89.11, 89.23, 89.28; 428/613; 75/415

[56] References Cited

U.S. PATENT DOCUMENTS

| | | | |
|---|---|---|---|
| 3,773,098 | 11/1973 | Rock . | |
| 4,917,857 | 4/1990 | Jaeckel et al. | 264/45.3 X |
| 5,112,697 | 5/1992 | Jin et al. | 428/613 |
| 5,334,236 | 8/1994 | Sang et al. | 75/415 |
| 6,024,157 | 2/2000 | Donahue et al. . | |

FOREIGN PATENT DOCUMENTS

1 379 157   1/1975   United Kingdom .

*Primary Examiner*—Curtis Mayes
*Attorney, Agent, or Firm*—Pro-Techtor International Services

[57] ABSTRACT

A method for producing metal with a porous sponge structure of which the shapes and sizes of the pores are controllable, including steps of selecting organic blanks according to the shapes and sizes of the pores to be shaped, selecting fractory mortar according to whether the sponge like metal to be made is an alloy of high melting point or of low melting point, and steps of dipping with mortar and drying of the organic blanks to have the blanks covered with refractory layers, sintering which carbonize and burn up the organic blanks in the refractory layers forms hollow ceramic balls (with granules of various desired sizes and shapes) which are graded and mixed according to the sponge structure to be arranged, accumulating the balls in a low pressure casting equipment for preheating and founding, thereby the hollow ceramic balls are agglomerated to form the porous sponge like structure which has a single or compound nature under control of low specific weight, compression strength, high toughness and the character of fire-proofing, sound insulation, heat insulation or magnetic wave disturbance-proofing.

4 Claims, 9 Drawing Sheets

METHOD FOR PRODUCING POROUS SPONGE LIKE METAL OF WHICH THE SHAPES AND SIZES OF PORES ARE CONTROLLABLE

BACKGROUND OF THE INVENTION

1. Field of the Invention

The present invention is related to a method for producing metal with a sponge structure of which the shapes and sizes of the pores are controllable, and especially to a method for producing porous sponge like metal, the physical and mechanical feature and quality of the sponge like structure of the metal can be changed by this method, and the shapes and sizes of the pores of the shaped metal structure can be controlled thereby, therefore, control of a single nature or a compound nature of specific weight, density, strength, toughness, fire-proof capability, sound insulation, heat insulation and magnetic wave disturbance-proofing etc. can be gotten in order to make the metal a metallic material of special structure.

2. Description of the Prior Art

A conventional processing technique to form a metal into the structure of a sponge has been used mainly taking aluminum as its metallic material, aluminum has the features of lightness and good heat-sinking capability, it is beneficial to being founded into an aluminum porous board (it is called in abreviation AP), the board is structurally formed to have aluminum alloy oxide thin film and a lot of foams, it is thereby capable of insulating conducting of heat, sound wave and electromagnetic wave etc., and can improve the original lightness and heat sinking capability of the aluminum material, so that it can become a construction material having the features of fire-proofing, sound insulation, heat insulation or magnetic wave disturbance-proofing etc.

However, the technique for casting the conventional aluminum porous board is not quite ideal, this is because that it is difficult to be controlled. in size, shape, volume, density and strength of its foams, and can only be formed the foam structure of the aluminum board with smaller unit areas, thereby, the foamed aluminum board made can only have limited capability of fire-proofing, sound insulation, heat insulation or magnetic wave disturbance-proofing etc. which is hard to be improved; any more, and in manufacturing of the conventional foamed aluminum board, it must expend very high cost for the equipment for continuous casting and foaming, and this is a technical impediment which is extremely troublesome, it is hard to control the size, density and independency of each foam of the porous structure manufactured, in this view, the physical and mechanical feature and quality of the porous structure is inferior, and this is the defect thereof.

Moreover, the technique for casting the conventional porous aluminum board (if it is not independently foamed or sponge like) does not suit other alloys, and there is not any technique for manufacturing porous sponge like structure on other alloys of high melting points or low melting points other than the porous aluminum boards in the markets. This is a pity by virtue that if the physical and mechanical feature and quality of these alloys other than aluminum can be made to manufacture a porous sponge like (or independent foamed) structure, the original materials can have their specific weight lowered, and have their single or compound nature of compression strength, fire-proofing capability, sound insulation, heat insulation or magnetic wave disturbance-proofing etc. improved. While such a technique has still not yet been developed in the markets.

SUMMARY OF THE INVENTION

The object of the present invention is to provide a method for producing sponge like metal of which the pores are controllable in shape and size, the method includes selection of metallic material for manufacturing the porous sponge like structure, control of the shapes and sizes of the pores after shaping, lowering of the specific weight of the structure, control of the density of the pores of the structure, for the purposes of increasing the capability in controlling the single nature or compound nature of compression strength, fire-proof capability, sound insulation, heat insulation or magnetic wave disturbance-proofing etc.

To obtain the above stated object, the present invention has the following steps of selecting blanks, metallic melt, refractory mortar etc. according to the shapes and sizes of the pores of the sponge like structure to be made, and the steps of dipping with mortar, drying, sintering, accumulation, preheating and low pressure casting etc.; wherein:

When in selecting blanks, in principle, selection of blanks must be done among organic matters (it has less problem of environmental conservation), the shapes and sizes of the blanks are exactly the factors to decide the shapes and volume of the unit hollow pores in the porous sponge like structure; while the arranged form and the density of the porous sponge like structure are controlled by an agglomeration mode in the step of accumulation.

The steps of selecting metallic melt and refractory mortar are very critical, thereby, in the present invention, there are two ways of selecting material for refractory mortar and preparation for alloys of high melting points and alloys of low melting points depending upon the attribute of the sponge like metals to be made, with the purpose of improving stability of the refractory layers formed apparently after mortar dipping, drying and sintering of the blanks, and thereby forming hollow ceramic balls with desired shapes and sizes which are agglomerated by low pressure casting, to form the sponge like metals of the structure having desired pore shapes together with the alloys of high melting points and alloys of low melting points.

In the steps of accumulation and low pressure casting, in order to effectively control the arrangement and density of the porous sponge like structure, the first way is that, hollow ceramic balls of large, medium and small volume are directly graded by ratio of amount and are uniformly premixed, and then are put into a die cavity provided with a low pressure casting equipment for accumulaion and preheating, and after Obtaining the desired arranged structural form and density, the porous hollow ceramic balls are subjected to low pressure casting for agglomeration; the second way is that, sticky and dense organic starch, wax, resin or organic plastic material for fine casting is used as a binding agent, and stickness as well as consistency thereof are under control, the uniformly premixed hollow ceramic balls of large, medium and small volume and having given shapes are agglomerated in advance to control the density of the agglomerated ceramic balls, a formwork is used for accumulation, the binding agent distributed in the gaps among the the hollow ceramic balls is dried. to form a shape fixed embryonic piece to help obtaining the desired arrangement and density of the porous structure, afterwards, the shape fixed embryonic piece having been dried is put in the low pressure casting equipment for preheating, and is cast with the metallic melt to burn up and carbonize the solid binding agent among the hollow ceramic balls, the agent then fills the gaps among the ceramic balls and agglomerates the independent and porous ceramic balls; by using these two ways of accumulation and agglomeration together with selection and grading in shape and size of the hollow ceramic balls, volume and sizes of the gaps among the hollow ceramic balls can be controlled, this can further effectively control the arrangement and density of the porous sponge like structure.

And more, compression, folding as well as bending strength and the character of fire-proofing, sound insulation, heat insulation or magnetic wave disturbance-proofing etc. of the porous sponge like structure can be effectively controlled through control of the thickness of the shells of the hollow ceramic balls (that is the thickness of the refractory layers of the blanks after mortar dipping, drying and sintering),the shapes and arrangement and density of the units of the hollow ceramic balls.

The present invention will be apparent after reading the detailed description of the preferred embodiments thereof in reference to the accompanying figures.

DETAILED DESCRIPTION OF THE PREFERRED EMBODIMENT

Figure 1:
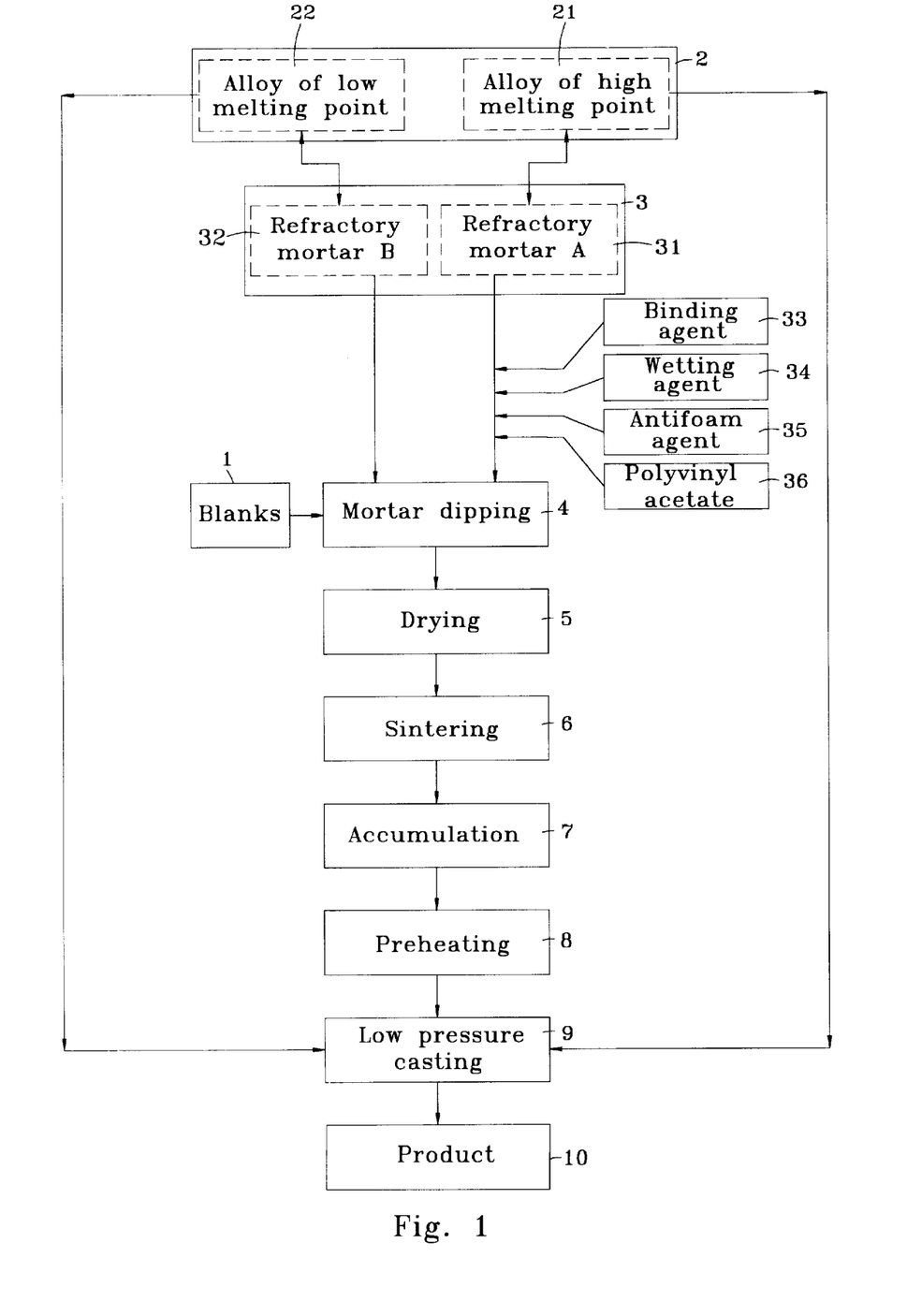
FIG. 1 is a main flow chart of the process in manufacturing the present invention.

Referring firstly to FIG. 1, the manufacturing method provided in the present invention for metal with a sponge structure of which the pores are controllable in shape and size comprises mainly the steps of selecting blanks 1, selecting metallic melt 2, selecting refractory mortar 3, and the steps of mortar dipping 4, drying 5, sintering 6, accumulation 7, preheating 8 and low pressure casting 9 etc. for the purpose of manufacturing a product 10 of the sponge like metallic material, wherein:

When in selecting blanks 1, the blanks 1 selected are of organic matter in principle, such as thermoplastic plastic granules, hard wax, or organic plant seeds or starch granules etc.

The shapes of the organic blanks 1 can be chosen from or made as round granules, elliptic granules, hexagonal crystalline granules or other desired shaped hollow pores of the shaped structure, so that after manufacturing of the sponge like structure, the desired effects of sound insulation, heat insulation, fire-proofing and magnetic wave disturbance-proofing etc. can be obtained.

In the case wherein the organic blanks 1 for instance are chosen from or made as round organic granules or elliptic organic granules (such as selecting rice, bean etc. of plant seeds or preformed plastic granules or hard wax etc.), after manufacturing of the sponge like structure, the desired effects of sound insulation, heat insulation, fire-proofing and magnetic wave disturbance-proofing etc. can be obtained; on the other hand, hexagonal crystalline granules can be made (such as hexagonal crystalline plastics or wax granules obtained by plastic injection forming or wax injecting techniques) as the organic blanks 1, after manufacturing of the sponge like structure, the compression strength, folding strength as well as bending strength are largely increased; a further step of accumulation 7 to be described afterwards is necessary for controlling of the arrangement and density of the sponge like structure, and metallic melt of suitable attribute must be selected for low pressure casting, the above mentioned desired effects of sound insulation, heat insulation, fire-proofing and magnetic wave disturbance-proofing etc. and the requirement for compression strength, folding strength as well as bending strength can be obtained.

Figure 2:
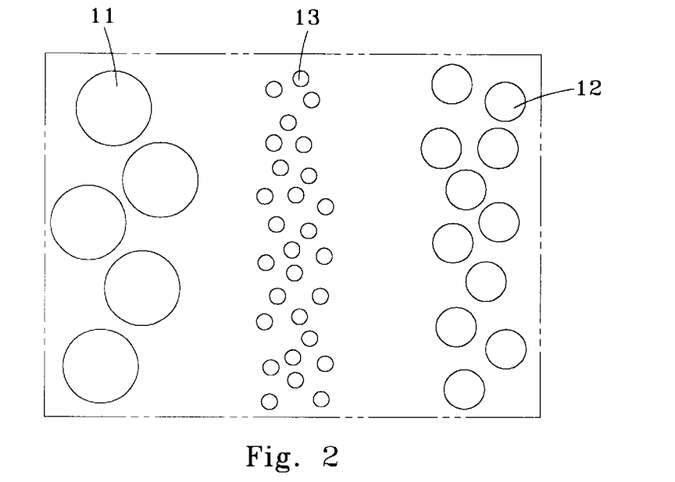
FIG. 2 is a schematic view of a blank group including three round blanks with different granular sizes used in the present invention.

In selecting round hard wax granules as the organic blanks 1, the following additional explanation shall be given: the organic blanks 1 are divided into large granules 11, medium granules 12 and small granules 13, the three kinds gather respectively in a. certain ratio to form a blank group (as shown in FIG. 2), during the steps of mortar dipping 4 toward sintering 6 in the process of manufacturing the hollow ceramic balls (will be described in detail hereinafter), the three kinds must be classified according to their sizes and volume and independently processed, so that the density of the sponge like structure can be controlled during the step of accumulation 7 thereafter, and thus uniform as well as good effect as a whole of sound insulation, heat insulation, fire-proofing and magnetic wave disturbance-proofing etc. can be obtained.

The steps of selecting metallic melt 2 and selecting refractory mortar 3 are further divided into selecting of A class refractory mortar 31 which has to be chosen when an alloy of high melting point 21 is used as metallic melt and selecting of B class refractory mortar 32 which has to be chosen when an alloy of low melting point 22 is used as metallic melt (as shown in FIG. 1); the refractory mortar must be provided with the following conditions:

1. resistance to hasty scouring of hot metallic melt;
2. smaller heat expansion for ensuring stability of the thickness of the refractory layer;
3. good high-temperature strength;

4. non-decomposable or non-crystallinic metamorphic under high temperature;
5. good contacting binding with metallic melt.

Based on the above stated conditions, the ingredients and characteristic of the refractory mortars in the following Table 1 can be chosen:

TABLE 1

Comparison for various refractory mortars in weight ratio of powder of their ingredients and in their temperature characteristic.

| Ingredients | $Al_2O_3$ | $ZrO_2$ | $SiO_2$ | $Na_2O$ | $Fe_2O_3$ | $TiO_2$ | CaO | MgO | Melting point (° C.) |
|---|---|---|---|---|---|---|---|---|---|
| Quartz | 0.11 | — | 99.8 | — | 0.033 | 0.022 | Tr | Tr | 1700 |
| Melted quartz | 0.05 | — | 99.9 | — | 0.02 | 0.015 | 0.01 | 0.005 | 1700 |
| Melted aluminum oxide | 99.5 | — | 0.3 | 0.35 | 0.03 | 0.015 | 0.05 | 0.005 | 2050 |
| Aluminum oxide (crystalline) | 99.0 | — | 0.1 | 0.02 | 0.4 | — | 0.07 | — | 2050 |
| Zirconium sand A | | 65.0 | 34.0 | — | 0.1 | 0.25 | — | — | 2300 |
| Zirconium sand B | 0.79 | Min 66.32 | Max 32.23 | — | Max 0.04 | Max 0.2 | — | — | 2300 |
| Zirconium oxide (stabilized) | 0.39 | 94.6 | 0.35 | — | 0.19 | 0.21 | 3.52 | 0.46 | 2690 |
| Calcium aluminum oxide | 79.0 | | 0.1 | 0.5 | 0.3 | — | 18.0 | 0.4 | 1700 |
| Baked clay | 41.6 | — | 52.8 | 1.2 | 1.5 | 2.5 | 0.3 | 0.4 | — |
| Flint granule | 47.5 | — | 47.7 | 0.9(total Alkali) | 1.1 | 2.5 | 0.2 | 0.2 | — |
| Melted mullite | 76.2 | — | 23.0 | 0.44 | 0.13 | 0.11 | 0.05 | 0.05 | 1080(decomposing) |
| Mullite | 73.5 | — | 22.4 | | 0.9 | 3.2 | — | — | 1080(decomposing) |
| Kyanite | 57~60 | — | 37~41 | | 0.08~0.4 | 1.2 | 0.3 | 0.3 | 1550(co-melting) |
| Molochite | 42~43 | — | 54~55 | $Na_2O$ 1 $K_2O$ 1.5~2.0 | 0.75 | 0.08 | 0.1 | 0.1 | — |

Figure 3:
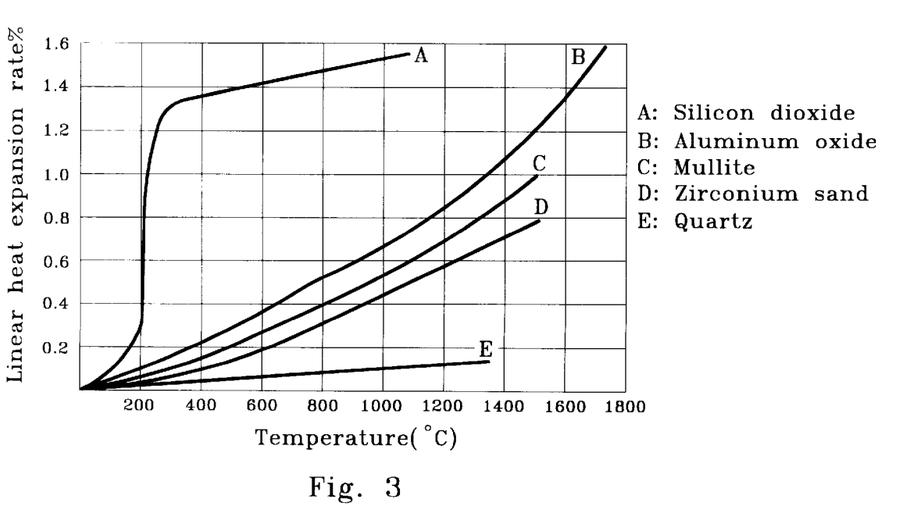
FIG. 3 shows curves of heat expansion characteristic of various refractory materials.

Please refer to the curves of heat expansion characteristic of various refractory materials in FIG. 3, the heat expansion rate of various refractory materials listed in Table 1 can be obtained from FIG. 3. In order to agglomerate the multiple refractory powder ingredients in Table 1 to form mortar, it is absolutely necessary to use binding agents, such as sodium silicate, ($Na_2SiO_3$), ethyl silicate or colloidal silicate ($SiO_2$) etc., these binding agents all function by the silica gel therein; the sodium silicate shall be neutrallized and decomposed by acid added therein when in preparation, by virtue of difficulty in control, it is subjected to gelatinous evolving which can reduce the binding function, it is therefore unsuitable to be used in the present invention; and when colloidal silicate is used as a binding agent, it must be decomposed by adding water, while affinity between water and ethyl silicate 40 is inferior, alcohol hence is required to add for preparation, and in order to get the function a catalyst, acid such as hydrochloride acid (HCl), sulfuric acid ($H_2SO_4$), nitric acid ($HNO_3$), acetic acid ($CH_3COOH$) or phosphoric acid ($H_3PO_4$) etc., this is complicated and inconvenient in operation, and therefore is unsuitable to be used in the present invention either; in principle, the binding agent 33 used in the present invention is more likely colloidal silicate which is more available and more convenient for operation, colloidal silicate has been being used in fine founding for many years, and can be easily obtained in the markets, and the chemical characteristic of colloidal silicate is very stable, it is not damaged unless it is stored in an environment below the ice freezing point, and so long as it is dehydrated to dry, it absorbs no more water for restoring its original nature, in view of this, colloidal silicate is very stable in storing as well as using, and this is the main reason that the present invention uses colloidal silicate as the binding agent 33.

More specifically therefore, when an alloy of high melting point 21 is used as a metallic melt in the present invention, the A class refractory mortar 31 can be chosen from Table 2 below:

TABLE 2

Composition and characteristic of the A class refractory mortar.

| | Type of mortars | | |
|---|---|---|---|
| Items | Mortar a | Mortar b | Mortar c |
| Colloidal silicate ($SiO_2$) 30% (1) | 13.6 | 11.3 | 11.3 |
| zirconium powder (325 mesh) (kg) | 45.3 | 45.3 | 40.8 |
| Interface activator (C.C) | 10.0 | 10.0 | 10.0 |
| Other | — | water 4.5 (1) | quartz 4.5 kg water 4.5 (1) |
| Characteristic | | | |
| Stickness (S) | (Zahn Cup 5#) 9–30 | (Zahn Cup 5#) 9–30 | (Zahn Cup 5#) 9–30 |
| Specific weight | 2.90–2.95 | 2.70–2.75 | 2.65–2.70 |

On the other hand, when an alloy of low melting point 22 is used as a metallic melt in the present invention, the B class refractory mortar 32 is composited by choosing gypsum refractory material, gypsum itself carries crystal water of two molecules ($CaSO_4 \cdot 2H_2O$), when it is used as a refractory material, water in the gypsum is partially removed depending on the working time and curing time required, when the remaining water is in the scope of 1–½ molecules [$CaSO_4 \cdot (1–½) H_2O$], the gypsum is turned into plaster, it only needs to add water therein when in preparation, and is normally available in the markets.

When a suitable refractory mortar 3 is selected according to the type and characteristic of the metallic melt 2 used, the A class refractory mortar 31 chosen when an alloy of high melting point 21 is used must be prepared in pursuance of the following point:

a. The A class refractory mortar 31 and the binding agent 33 are uniformly mixed under high rotation speed of 1725 rpm of a swirl impeller in an agitating barrel, and then are put into a rotating barrel for the step of mortar dipping 4. Wherein, it must be noted that when preparation of the mortar is completed, the agitating barrel must be kept running slowly before the step of mortar dipping 4, so that the A class refractory mortar 31 and the binding agent 33 can be kept in the best state wherein they are in a most uniform mixing state.

b. Control of stickness of the mortar is normally measured by Zahn cups 4# and 5#, if a Zahn cup 5# is used for preparation, the stickness obtained at 9–30 seconds is more suitable (referring to the Table 2).

c. Add in a wetting agent 34 which is an interface activator in the A class refractory mortar 31 and the main purpose thereof is to make the mortar easier in sticking on the blanks 1 made from plastic granules, wax granules, or organic plant seeds or starch granules. Generally, if ethyl silicate is used as the binding agent 33, it can get better wetting quality, and therefore does not need the wetting agent 34.

d. Add in an antifoam agent 35 (n-Octyl alcohol) which can reduce foams in the mortar, the agent will not gelatinize the mortar, hence it provides stability in use.

e. Add polyvinyl acetate to increase wet strength of the A class refractory mortar 31, when wax granules are chosen as the blanks 1 for the step of mortar dipping 4, the polyvinyl acetate can prevent wax from separation; and when in sintering 6, the polyvinyl acetate can prevent the blanks 1 made from plastic granules from breaking; and after the step of sintering 6, the polyvinyl acetate can have the effect of removing the organic substance in the refractory layer 50.

Figure 4:
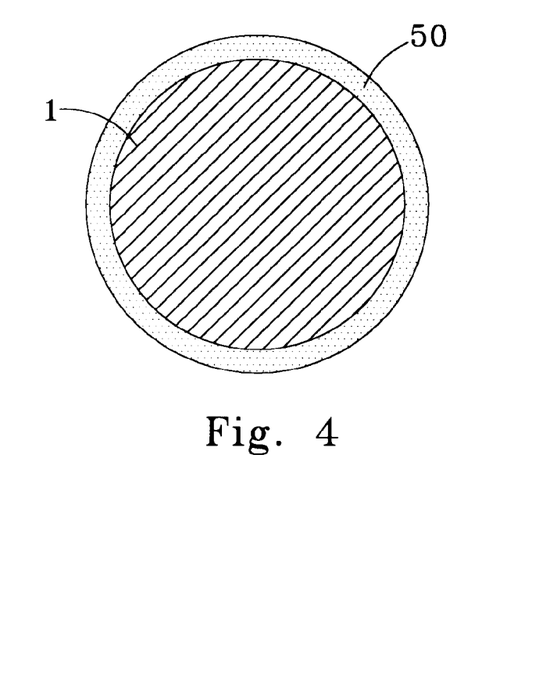
FIG. 4 is a sectional view showing a refractory layer formed around a blank of the present invention.
Figure 5:
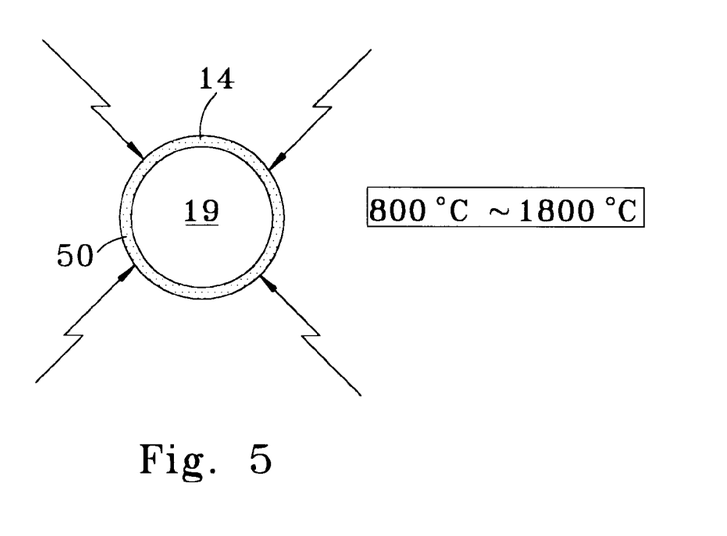
FIG. 5 is a sectional view showing a hollow ceramic ball unit of the present invention.
Figure 6:
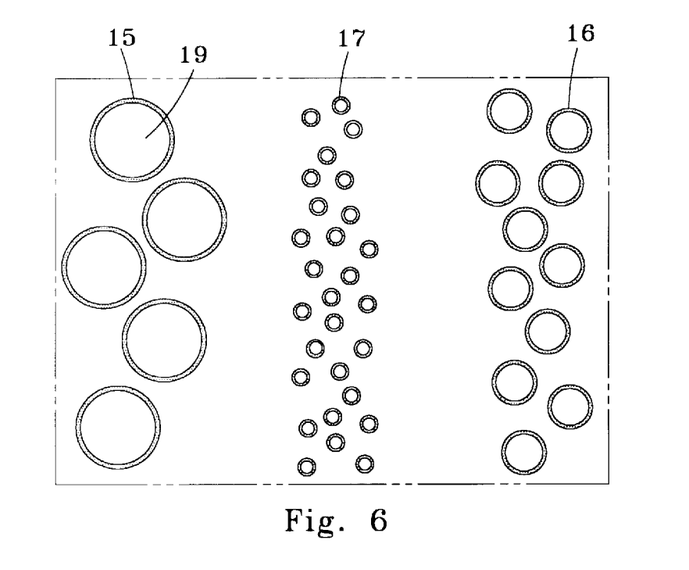
FIG. 6 is a schematic view of a ceramic ball group including three kinds of hollow ceramic balls with different sizes and volume used in the present invention.

After preparation of the above stated suitable mortar 3, it must be subjected to operation of mortar dipping 4 depending on its classification and on the volume of the organic blanks 1 selected, and then is dealed with in the drying step 5 under the temperature of 130° C.±20° C., so that the exterior layer is formed a hardened refractory layer 50 (as shown in FIG. 4); and then is sent back to the step of sintering 6 in a rotation oven under the temperature of 800° C.–1800° C. to burn up and carbonize the organic blanks 1 in the refractory layer 50, and to make the hollow ceramic balls 14 having pores 19 (as shown in FIG. 5). Wherein, the organic blanks 1 of various shapes and sizes and volume can all be classified in proceeding the steps of mortar dipping 4, drying 5 and sintering 6, then the hollow ceramic balls 15, 16 and 17 of various sizes and volume with required ratios of amount (as shown in FIG. 6) can be obtained for use in the subsequent step of accumulation 7.

Figure 7:
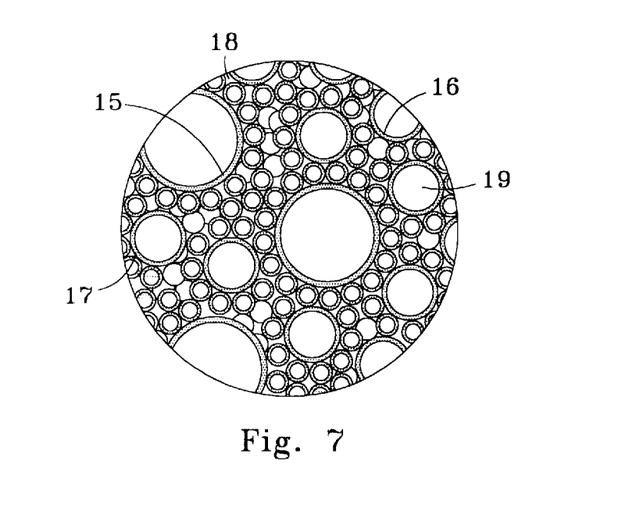
FIG. 7 is an enlarged sectional view showing uniform mixing of various hollow ceramic balls with different amount, shapes, sizes and volume of the present invention.

The step of accumulation 7 is divided into a direct accumulation mode and an indirect accumulation mode wherein a shape fixing agent 72 is used to agglomerate, a formwork 73 is used to fix shape, and drying 74 is used to get a shaped embryonic piece 75. These modes are described as below:

In the direct accumulation mode, the hollow ceramic ball groups 15, 16 and 17 of various amount, shapes and sizes in required ratios are uniformly mixed (as shown in FIG. 7), and placed directly in a die cavity 91 in an equipment for low pressure casting 9, the uniformly mixed hollow ceramic balls 15, 16 and 17 can thus provide desired arrangement and density of distribution, and can directly go for accumulation to form an embryonic form of a porous sponge like structure, wherein the gaps 18 formed in accumulation can be the flow ways for the subsequent low pressure casting for the metallic melt 2 (as shown in FIG. 7).

Figure 8:
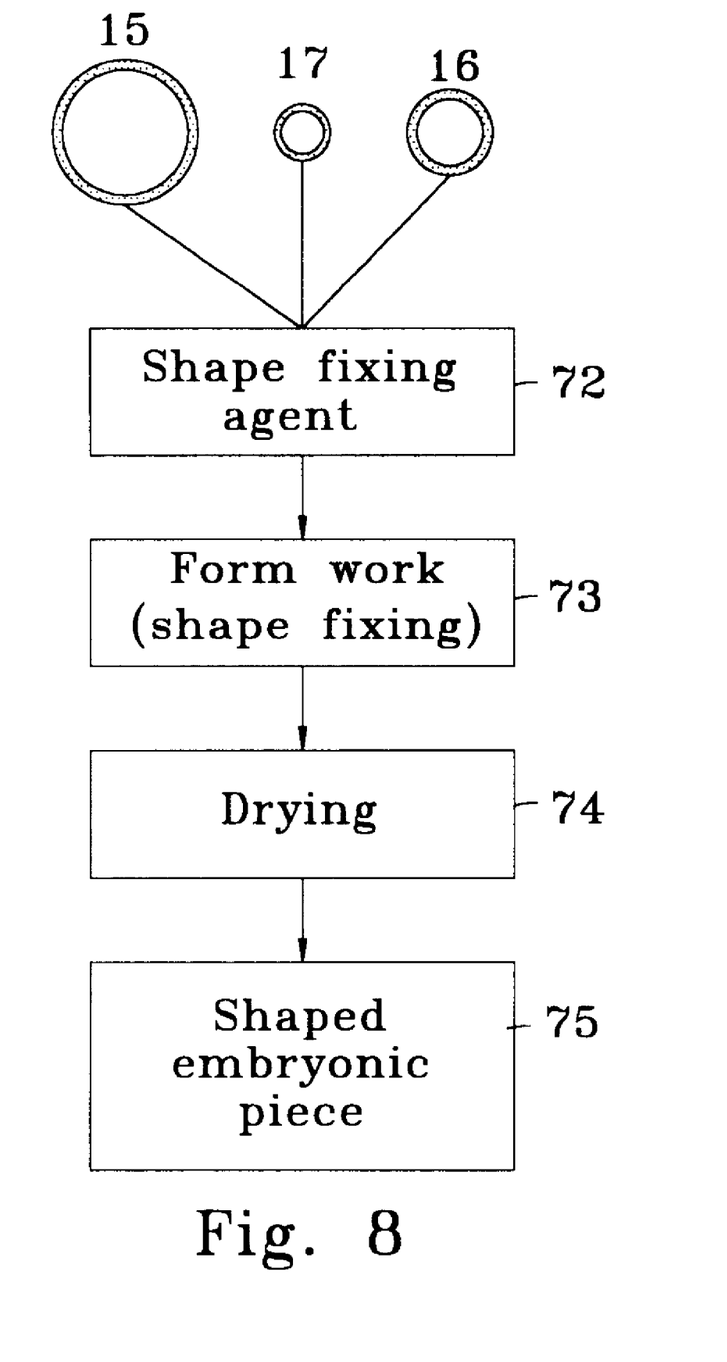
FIG. 8 is a flow chart of the process of indirect accumulation method of the present invention.
Figure 9:
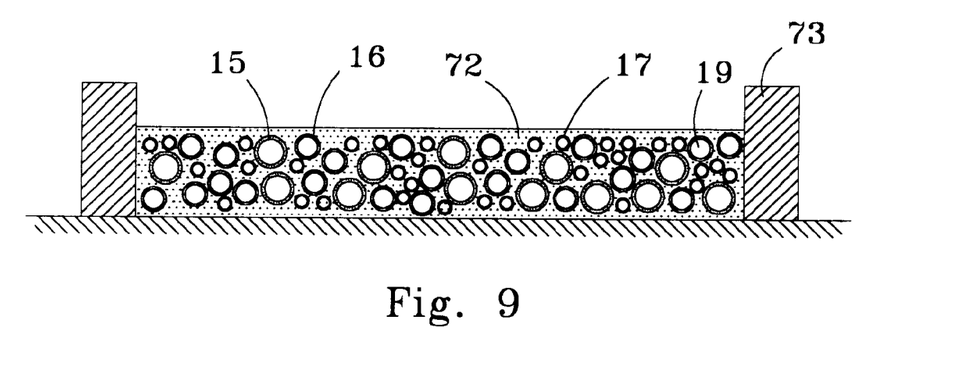
FIG. 9 is a sectional view showing forming of a shape fixed embryonic piece made by means of a formwork by the accumulation method of the present invention.
Figure 10:
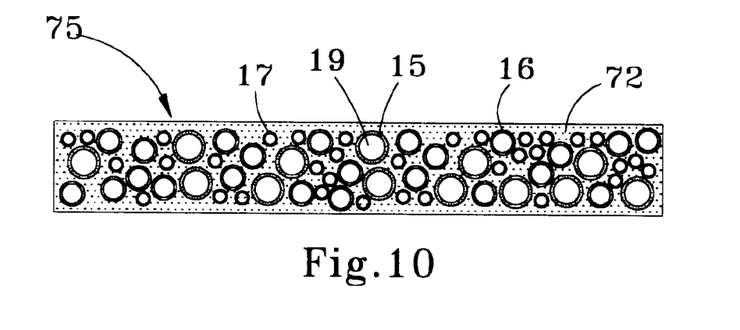
FIG. 10 is a partial enlarged sectional view of the shape fixed embryonic piece of the present invention.

In the indirect accumulation mode (as shown in FIG. 8), a sticky shape fixing agent 72 must be chosen to stir and agglomerate in advance the uniformly mixed hollow ceramic balls 15, 16 and 17 of various amount, shapes and sizes in required ratios, and then pour them into a formwork 73 having a desired shape for fixing their shape (as shown in FIG. 9), the sticky shape fixing agent 72 among the hollow ceramic balls 15, 16 and 17 is then dried under the normal temperature or a slightly warm temperature to allow the shaped embryonic piece 75 of a porous sponge like structure to be taken out of the formwork 73 (as shown in FIG. 10).

In the above mode, the sticky shape fixing agent 72 is used to control the density of the structure containing the hollow ceramic ball groups and the transient strength of agglomeration among the hollow ceramic ball units when in casting of the metallic melt 2. The sticky shape fixing agent 72 can be chosen from the material of wax for fine casting, organic starch, organic gel or resin etc.

Thereafter, the equipment for low pressure casting 9 with heating function with a constant temperature is used to practise the preheating step 8 and casting of the metallic melt 2.

Figure 11:
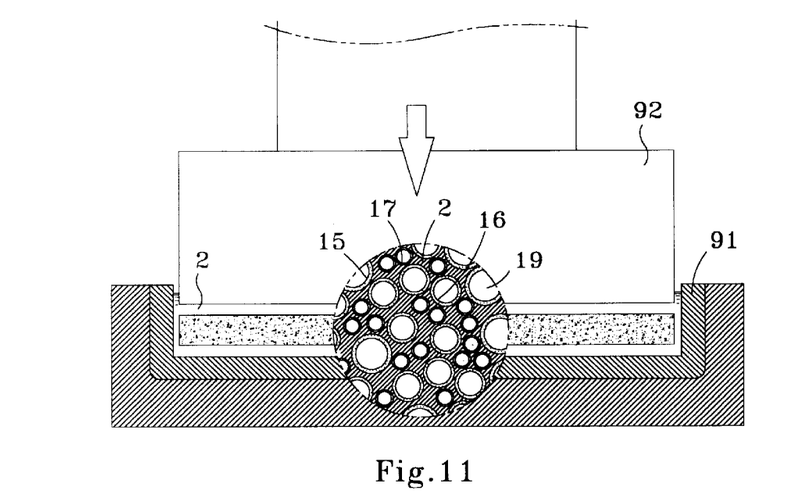
FIG. 11 is a partial enlarged sectional view showing casting of metallic melt into the gaps of the structure of the present invention.
Figure 12:
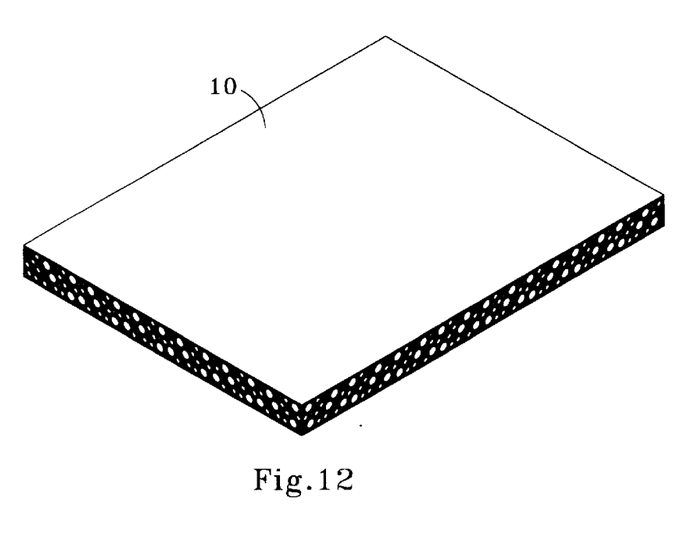
FIG. 12 is a perspective schematic view of a product having round shaped pores and made of sponge like metallic material of the present invention.

In which, the hollow ceramic ball groups 15, 16 and 17 arranged by the direct accumulation step is directly accumulated in the die cavity 91 in the equipment for low pressure casting 9, thereby, the ceramic ball groups 15, 16 and 17 must be preheated in the die cavity 91 in advance, so that when in casting of the metallic melt 2, fluidity of the metallic melt 2 in gaps 18 can be increased; then a pressing plate 92 is used to cast the metallic melt 2 made of the above mentioned alloy of high melting point 21 or the alloy of low melting point 22 into the die cavity 91 and to discharge gas smoothly, then the metallic melt 2 can be smoothly poured into the gaps 18 (as shown in FIG. 11), so that the hollow ceramic ball groups of the sponge like structure can be melted together and are given fixed shapes, and a product 10 made of the sponge like metal and arranged and founded with the ceramic balls 15, 16 and 17 having round pores 19 is obtained (as shown in FIG. 12).

The shaped embryonic piece 75 of the porous sponge like structure made by the indirect accumulation mode is placed directly in the die cavity 91 in the equipment for low pressure casting 9 to practise the preheating step 8, and the pressing plate 92 is used to cast the metallic melt 2 into the shaped embryonic piece 75 of the porous sponge like structure, and the shape fixing agent 72 among the ceramic balls 15, 16 and 17 is totally burned up and carbonized by the metallic melt 2, during the transient period of burning up and carbonizing by the metallic melt 2, the metallic melt 2 fills immediately in the gaps 18, in this way, the product 10 made of the sponge like metal of which the density as well as strength are controlled is obtained (as shown in FIG. 12).

Wherein, before casting of the metallic melt 2, it is a necessary procedure that the die cavity 91 with heating function with a constant temperature in the equipment for low pressure casting 9 is used to practise the preheating step 8 to directly preheat the sponge like hollow ceramic ball groups 15, 16 and 17 well accumulated in the die cavity 91, or to preheat the shaped embryonic piece 75 of the porous sponge like structure in the die cavity 91, this is because that the preheating step 8 is beneficial to increasing of fluidity of the metallic melt 2 during pouring of it into the gaps 18, especially when the alloy of low melting point 22 is used as the metallic melt 2.

Figure 13:
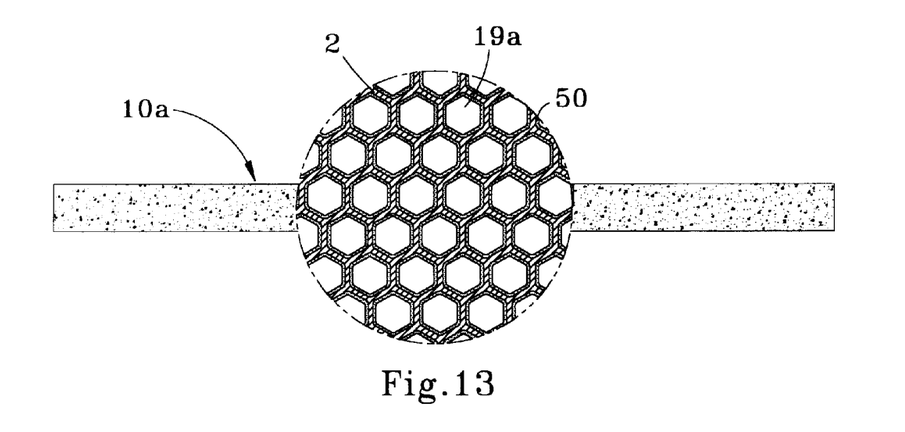
FIG. 13 is a partial enlarged sectional view of a product having hexagon shaped pores and made of sponge like metallic material of the present invention.

The above statement is pointed to the embodiment using the round shaped granular blanks 1, however, practically, when in use of the selected or manufactured hexagonal crystalline granular organic material as the blanks 1, it is necessary too to use suitable amount of the metallic melt 2 and the refractory mortar 3 to practise the steps of mortar dipping 4, drying 5, sintering 6, accumulation 7, preheating 8 and low pressure founding 9 etc. for the purpose that the hollow pore 19a of a product 10a of sponge like metallic material can have a honeycomb like hexagonal crystalline shape (as shown in FIG. 13), so that strength of the sponge like metallic structure can be increased to the best state, i.e., to the degree that the compression, folding as well as bending strength are enstrengthened.

Figure 14:
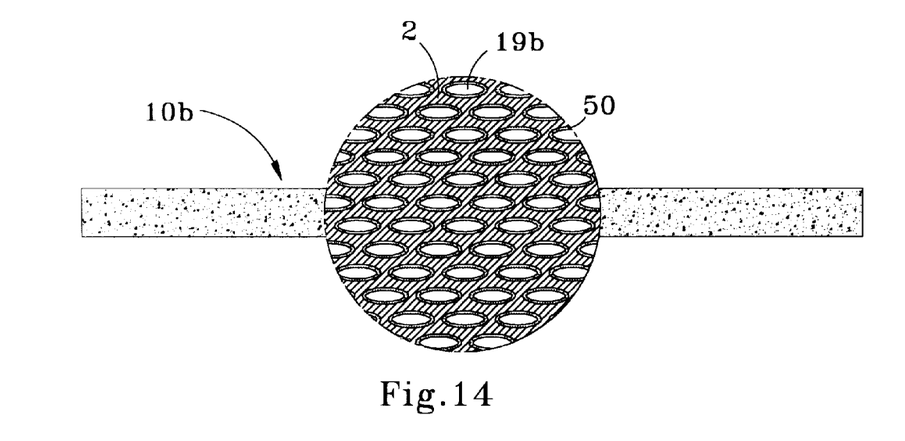
FIG. 14 is a partial enlarged sectional view of a product having ellipse shaped pores and made of sponge like metallic material of the present invention.

Relatively, when in use of the selected or manufactured elliptical granular (or otherwise shaped) organic material as the blanks 1, suitable amount of the metallic melt 2 and the refractory mortar 3 can also be selected to practise the steps of mortar dipping 4, drying 5, sintering 6, accumulation 7, preheating 8 and low pressure casting 9 etc. for the purpose that the hollow pores 19b of a product 10b of sponge like metallic material can have elliptical shapes as that of the original blanks 1 (as shown in FIG. 14) or some other shapes, so that strength and the character of fire-proofing, sound insulation, heat insulation or magnetic wave disturbance-proofing etc. of the porous sponge like structure can be increased. One thing is worth mentioning, when organic blanks 1 are selected to form the shapes of the unit pores of the sponge like structure, under control of the accumulation step 7, the direction of accumulation of the hollow ceramic balls can be changed to obtain control of the directions of forming of the pores beside control of the shapes and density of the pores.

Figure 15:
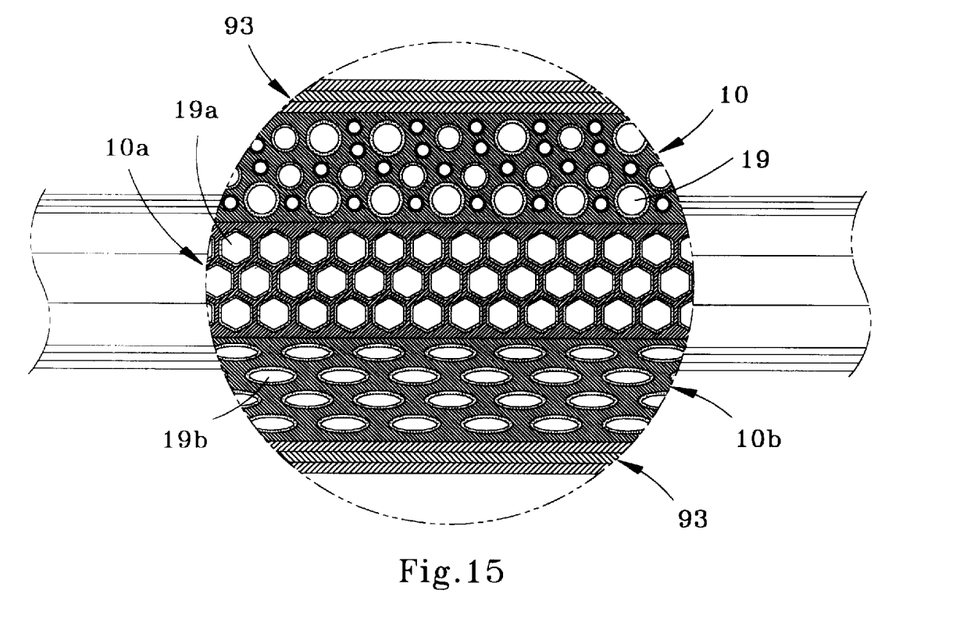
FIG. 15 is a partial enlarged sectional view showing glue binding of a product having multiple layers and made of a sponge like metallic material with good toughness in the present invention.

While the products 10, 10a and 10b of the sponge like metallic material having the round, the hexagonal crystallin granular and the elliptical pores 19, 19a and 19b can be mutually glued to form a multiple-layer plywood type structure (as shown in FIG. 15), each layer can be glued with one or more than one layers of tough material 93 (such as fibrous carbon cloth, ply-metal or metallic netted plate etc.), in order to meet the single or combined requirement of compression strength, toughness, fire-proofing, sound insulation, heat insulation as well as magnetic wave disturbance-proofing.

In conclusion, the method for manufacturing the sponge like metallic material of the present invention, of which the shapes and sizes of the pores are controllable by using the shaping technique for forming the sponge like hollow ceramic balls, can solve the problem in controlling density as well as strength of the sponge like structure in accumulation, and heat insulation (namely fire-proofing), sound insulation, or magnetic wave disturbance-proofing etc. of the porous structure, and meantime can change the metal quality of the sponge like structure. The present invention therefore is highly technically valuable.

Having thus described my invention, what I claim as new and desire to be secured by letters patent of the United States are:

1. A method for producing metal with a porous sponge structure of which the shapes and sizes of pores are controllable, comprising the following steps:
   (a) selecting blanks, said blanks are organic materials with pore shapes and ratios selected according to the shapes and sizes of pores desired in said metal;
   (b) selecting a metallic melt;
   (c) selecting a refractory mortar;
   (d) dipping organic blanks in said refractory mortar;
   (e) drying said organic blanks dipped in said refractory mortar so as to form external refractory layers on said organic blanks;
   (f) sintering said organic blanks in a rotation oven to form hollow ceramic balls with desired characteristics; and
   (g) selecting, uniformly mixing, and accumulating said hollow ceramic balls according to the type of metal with a porous sponge structure required, desired characteristics of said porous sponge structure being controlled by distribution and characteristics of said hollow ceramic balls, and during accumulation, a sticky shape fixing agent is added to agglomerate said uniformly mixed hollow ceramic balls, said balls are then poured into a form having a desired shape, and said shape fixing agent is then dried to allow a shaped embryonic piece of said porous sponge structure formed by accumulation to be taken out of said form;
   (h) preheating said porous sponge structure formed by accumulation; and
   (i) low pressure casting said accumulated structure using said metallic melt so that said hollow ceramic balls are melted together and given a fixed orientation, thereby generating said metal with said porous sponge structure.

2. The method for producing metal with a porous sponge structure as claimed in claim 1, wherein;
   said shape fixing agent is made of wax, organic starch, organic gel, or resin.

3. The method for producing metal with a porous sponge structure as claimed in claim 1, wherein;
   said shape fixing agent is carbonized and burned up during said low pressure casting by using said metallic melt, so that said metallic melt replaces said shape fixing agent to form said hollow ceramic balls, and thus forms said metal with said porous sponge structure.

4. A method for producing metal with a porous sponge structure of which the shapes and sizes of pores are controllable, comprising the following steps:
   (a) selecting blanks, said blanks are organic materials with pore shapes and ratios selected according to the shapes and sizes of pores desired in said metal;
   (b) selecting a metallic melt;
   (c) selecting a refractory mortar;
   (d) dipping organic blanks in said refractory mortar;
   (e) drying said organic blanks dipped in said refractory mortar so as to form external refractory layers on said organic blanks;
   (f) sintering said organic blanks in a rotation oven to form hollow ceramic balls with desired characteristics;
   (g) selecting, uniformly mixing, and accumulating said hollow ceramic balls according to the type of metal with a porous sponge structure required, desired characteristics of said porous sponge structure being controlled by distribution and characteristics of said hollow ceramic balls;

(h) preheating an accumulated structure of said hollow ceramic balls;

(i) low pressure casting said accumulated structure using said metallic melt so that said hollow ceramic balls are melted together and given a fixed orientation as a sheet, thereby generating said metal with said porous sponge structure; and (j) repeating steps a–i while varying the characteristics of said hollow ceramic balls as desired, joining a plurality of sheets formed together to form a multiple-layer structure.

* * * * *